March 15, 1955  L. E. DOSHIER  2,704,141
VARIABLE SPEED HYDRAULIC TRANSMISSION
Filed April 17, 1952  5 Sheets-Sheet 1

Inventor
Luchion E. Doshier
By Frank J. Schraeder Jr.
Attorney

March 15, 1955 L. E. DOSHIER 2,704,141
VARIABLE SPEED HYDRAULIC TRANSMISSION
Filed April 17, 1952 5 Sheets-Sheet 3

Inventor
Luchion E. Doshier
By Frank J. Schraeder Jr.
Attorney

United States Patent Office 2,704,141
Patented Mar. 15, 1955

1

2,704,141

VARIABLE SPEED HYDRAULIC TRANSMISSION

Luchion E. Doshier, Wichita, Kans., assignor to Thomas Hydraulic Speed Controls, Inc., Wichita, Kans., a corporation of Kansas Application April 17, 1952, Serial No. 282,822

6 Claims. (Cl. 192—61)

The present invention relates to that type of variable speed hydraulic transmission wherein two fluids are employed in variable mixtures as well as independently, and wherein the control of the independent flow of the fluids or the relatively varied proportionate mixtures thereof is effected through novel valve means adapted for metering or arresting the flow of the fluids in their circulation through a fluid-circulating power-transmitting instrumentality as, for example, a gear type pump commonly employed in hydraulic couplings such as disclosed in patents Re. 22,577, 2,526,914, and 2,531,014.

In its broad aspect the present invention may be said to have for its object to provide a variable speed hydraulic transmission mechanism that shall be simpler, more compact and more efficient and, also, easier and less costly to manufacture and maintain, than those in the prior art.

In each of the hydraulic transmissions disclosed in the aforesaid patents there is included a rotating casing partially filled with oil in which parts of the mechanism revolve. One of the objects of the present invention is to eliminate such casing and, thereby, reduce the size of the apparatus.

In lieu of the conventional rotating casing or reservoir, I use any desired external source of oil-supply. A further object of the present invention may, therefore, be said to be the creation of simple means for delivering oil to the pump mechanism from an extraneous source to meet the demands of the aforesaid type of transmission.

Since some external oil supply source is required, the need is fulfilled in some instances by the presence of a body of oil that is being used for other purposes. For example, the crank case of an internal combustion engine contains lubricating oil that is suitable for use in my transmission. Therefore, viewing my invention in another aspect, it may be said to have for an object to create a novel variable speed hydraulic transmission that can be substituted for the conventional flywheel and friction clutch of an internal combustion engine and, in its operation, use any conveniently stored body of oil or the oil at hand in the engine crank case.

The reduction in size through elimination of the revolving oil casing is of great importance in that engine frames do not require to be redesigned to provide additional space for the reception of the hydraulic transmission, as so often is necessary in the case of older types of hydraulic transmissions having rotating casings that carry their own fluid reservoirs.

By permitting the use of an external, independent oil reservoir I not only make the engine crank case oil available for use in a hydraulic transmission mounted on an engine shaft, but there can also be achieved the advantage of operating with cool oil instead of oil that becomes heated during the use of the transmission. This is made possible because some engines are at present provided with means to cool the crank case oil and, if an engine does not have such means, one can readily be installed.

The various features of novelty whereby the present invention is characterized will hereinafter be pointed out with particularity in the claims; but, for a full understanding of the invention and of its various objects and advantages, reference may be had to the following detailed description taken in connection with the accompanying drawings, wherein:

Fig. 1 is a longitudinal section, taken on line A—B

2 of either Fig. 2 or Fig. 3, through a hydraulic transmission embodying a preferred form of my invention, showing parts of the fluid circuit control in neutral operation position.

Fig. 6 is a longitudinal section on line 6—6 of Fig. 3 through one of the discharge valves which is shown in neutral position so that only air can be circulated through the pump mechanism.

Fig. 7 is a section on line 7—7 of Fig. 6, being a cross section showing intake, discharge and pressure relief valves and ports.

Fig. 8 is a section on line 8—8 of Fig. 3, through one of the three pressure relief valves.

Fig. 9 is a section on line 9—9 of Fig. 8, showing only the relief valve and parts of the pump body immediately adjacent thereto.

Figure 1:
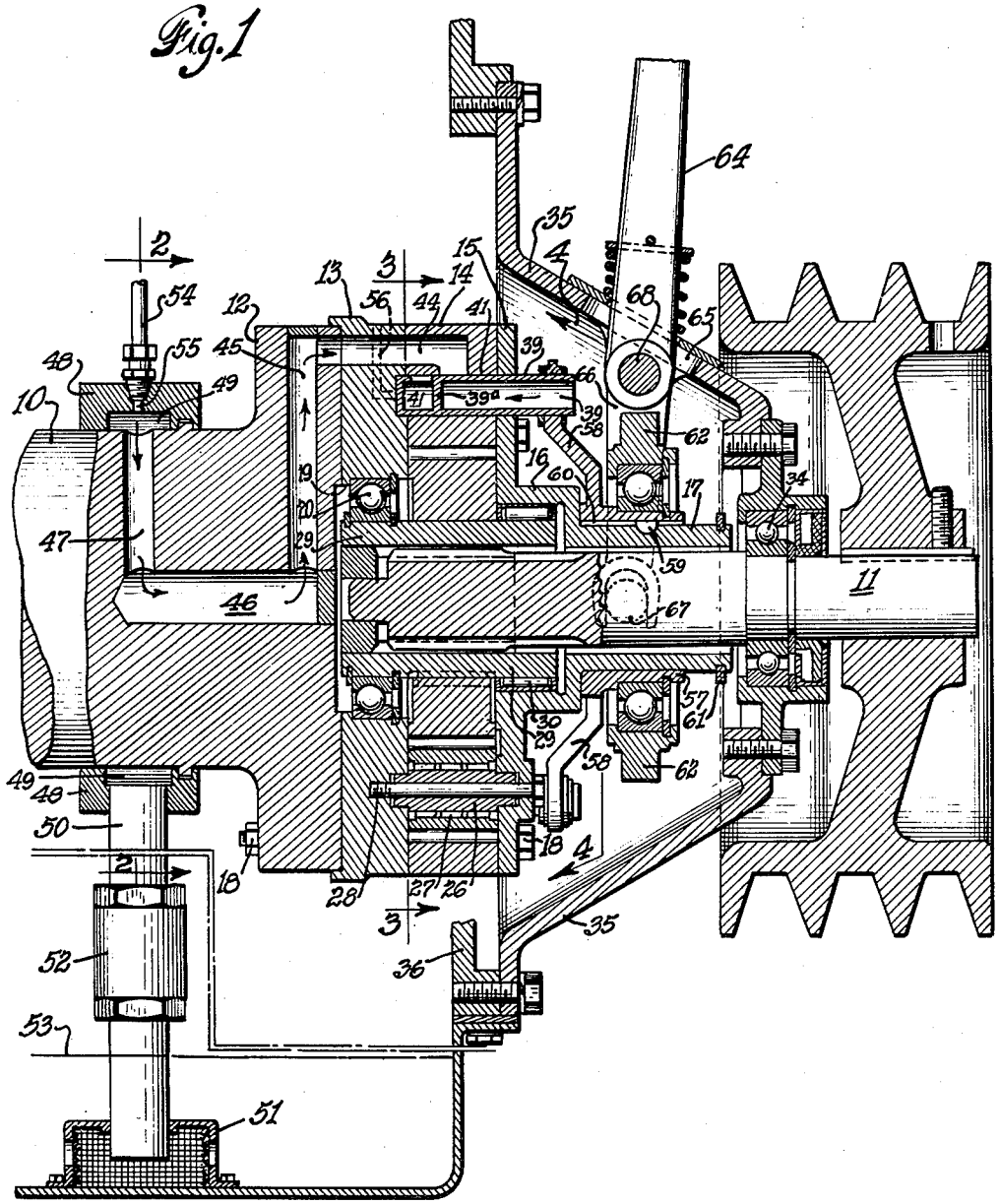
Figure 2:
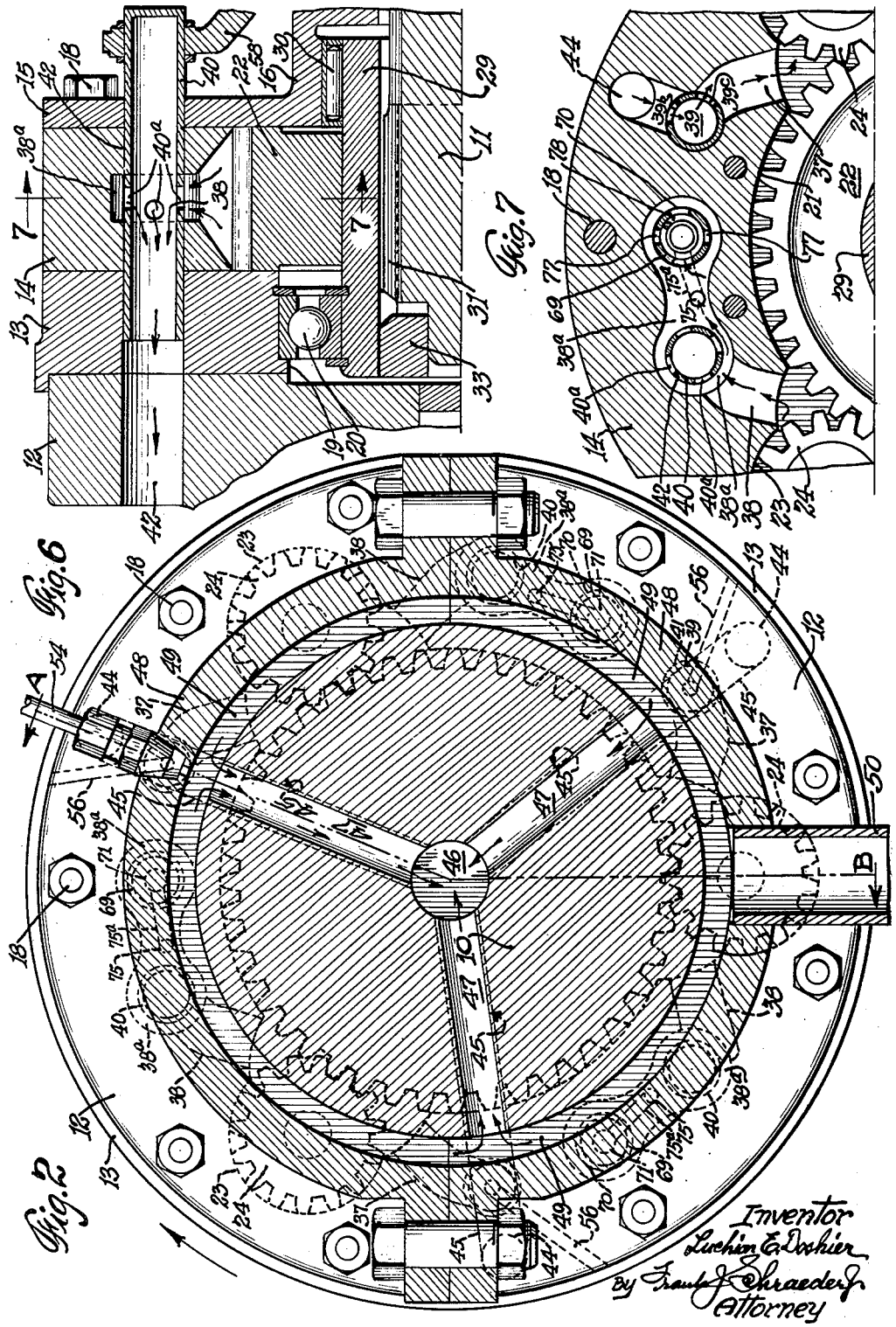
Fig. 2 is a section, on a larger scale, taken on line 2—2 of Fig. 1, showing oil intake passages in one end of the driving shaft and valve-controlled intake and discharge ports in the pump body.
Figure 3:
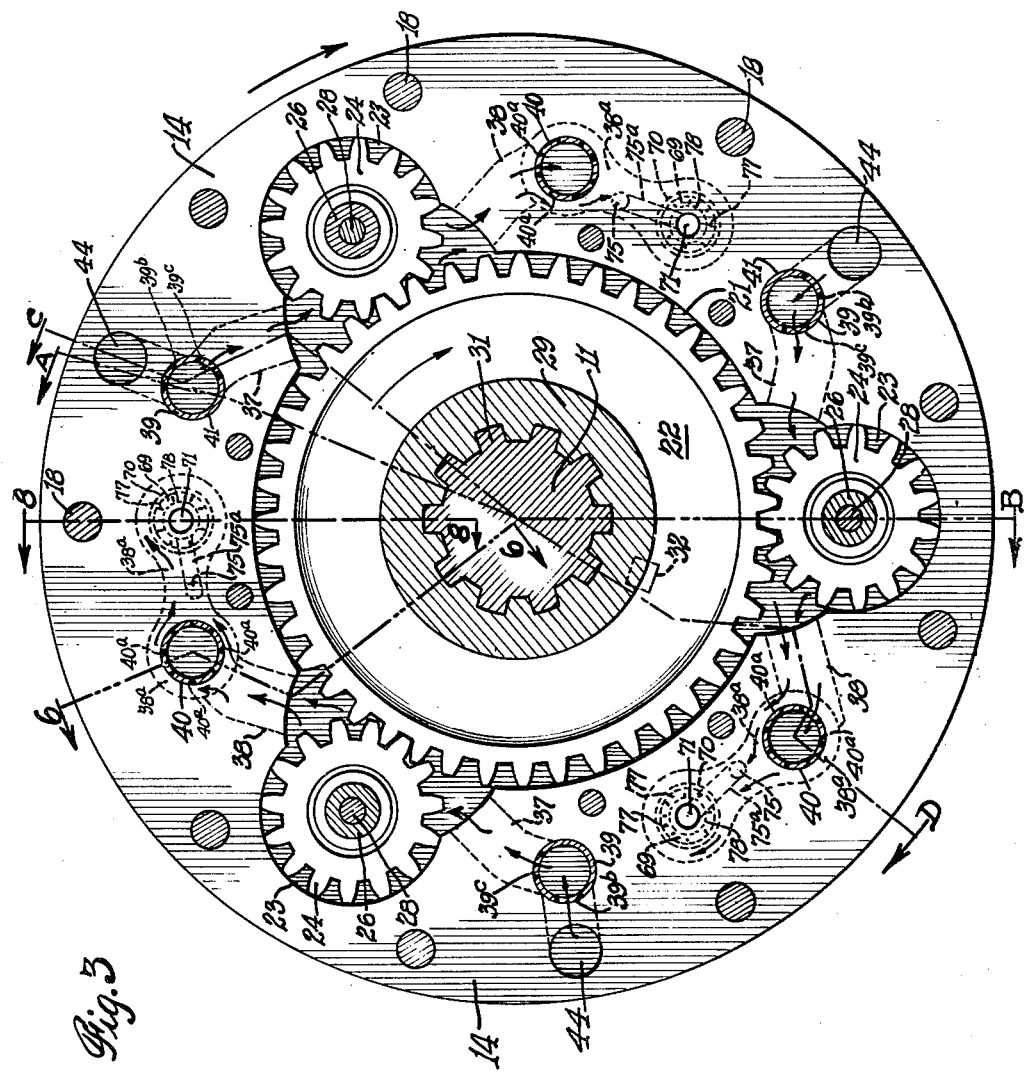
Fig. 3 is a section on the same scale as Fig. 2, taken on line 3—3 of Fig. 1, showing the intake and discharge ports in the pump body, together with the pump sun and planet gears.
Figure 4:
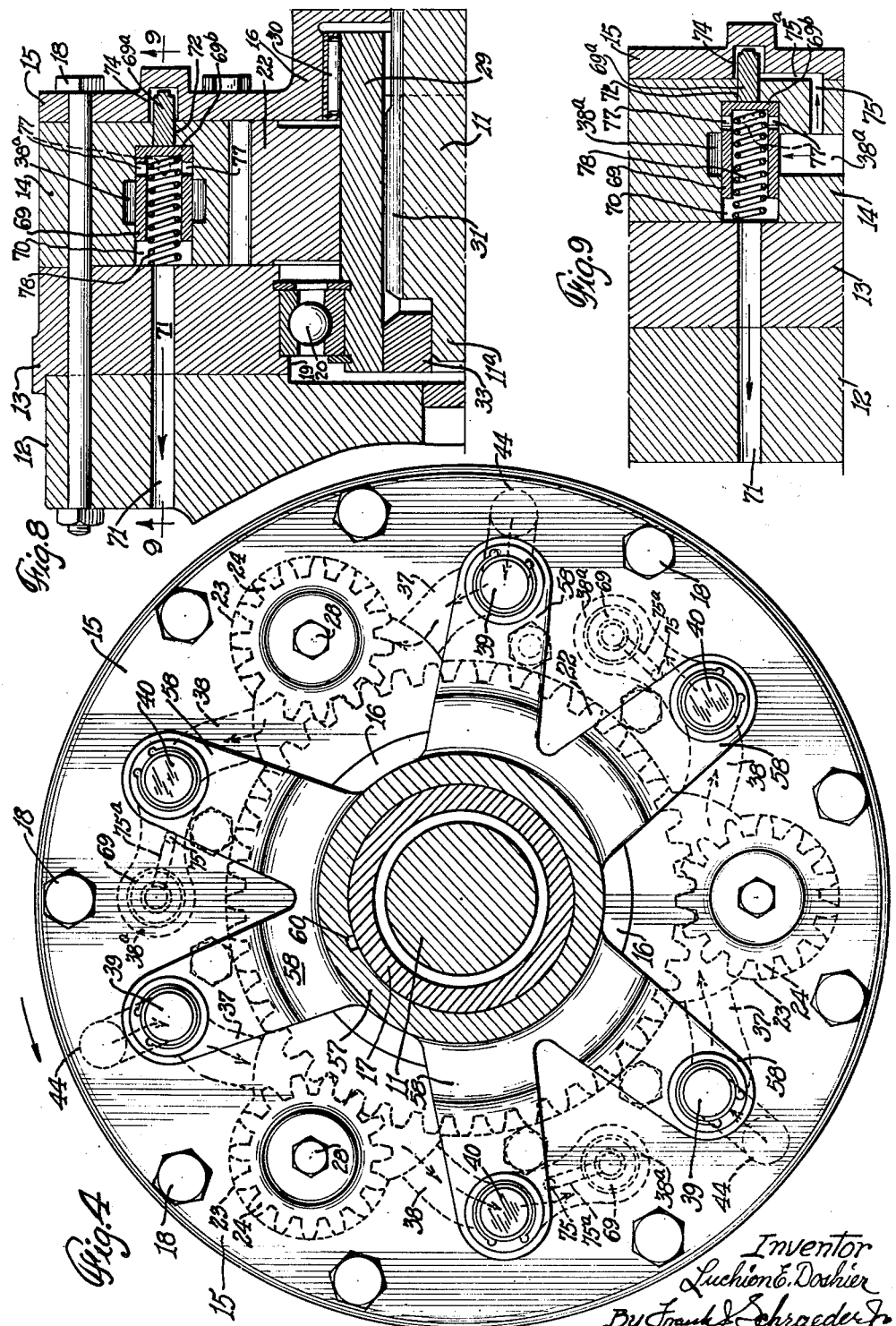
Fig. 4 is a section, on the same scale as Figs. 2 and 3, taken on line 4—4 of Fig. 1, showing the valve shifter with the integral arms or spider operatively connected to the intake and discharge control valves.

In the drawings, the invention is illustrated as applied to an industrial engine and, for the sake of brevity, only this particular embodiment will be described in detail; the principles involved remaining the same regardless of the particular use to which the transmission is put.

Referring to the drawings, 10 is a shaft driven by any prime mover being, in this instance, the crank shaft of the engine, while shaft 11 is a shaft to which variable speed and power is to be transmitted by shaft 10; the shafts being arranged in longitudinal alignment with each other.

The driving shaft 10 has on an end thereof a flange 12 that provides the shaft with an end face of larger diameter than the body of the shaft. Engaged with the face of this flange 12 is a thick plate 13 of about the same diameter. A second, thicker plate 14, which constitutes the body of a gear pump, fits against plate 13. Engaged with the outer side of plate 14 is a third plate 15, the central portion of which extends outwardly in the form of a cylindrical hub 16.

The outer end wall of the hub 16 is integral with and forms a flange on an axial sleeve 17 that may be said to be an extension of the hub 16. The sleeve 17 has an internal diameter greater than that of the driven shaft 11. Plates 13, 14 and 15 are fastened together and to the flange 12 on the crank shaft by bolts 18, to form a pump housing fixed to and rotatable with the crank shaft 10.

Plate 14 is the body or planet gear carrier and plates 13 and 15 constitute end closures for the pump housing. Plates 13 and 14 have circular openings in their central portions; the opening 19 in plate 13 having a ball bearing assembly 20 fitted into the same; whereas the larger of the two openings, opening 21 in plate 14, contains the sun gear 22 of a multiple gear pump.

Surrounding the opening 21, and in open communication therewith, are cavities 23 that contain planet gears 24 which mesh with the sun gear 22 in the conventional way; these cavities 21 and 23 therefore being pump chambers through which fluids are circulated when the transmission is in operation.

Each planet gear 24 is rotatably supported on an axle-like element 26 surrounded by rollers 27 and held in place by a bolt 28 that extends through closure plate 15, axially through element 26 and into plate 13.

The sun gear 22 is fastened to the driven shaft 11 which extends freely through the hub 16 and sleeve 17 of the outer closure plate 15 and axially across the interior of the pump body 14 almost to the crank shaft flange 12. The shaft-receiving opening in the sun gear 22 is of larger diameter than the driven shaft 11 to leave room for a sturdy sleeve 29 between the shaft 11 and the gear 22. This sleeve 29 extends across the entire axial length of the pump housing and into hub 16; the inner or rear end extending into and being operatively associated with ball bearing assembly 20; while the other end is surrounded by bearing rollers 30 arranged between the sleeve 29 and the cylindrical wall of hub 16. The sleeve 29, shaft 11 and gear 22 may be fastened together in any suitable way. In the arrangement shown the sleeve 29 is fastened to the driven shaft 11 by splines 31 and to the sun gear 22 by a key 32.

The driven shaft 11 has at its extreme inner end an axial projection 11ª of reduced diameter, that fits into a ring-like plug 33 that is pressed into the corresponding end of sleeve 29. In addition to the ball bearing 20, there is a second ball bearing for the driven shaft 11, namely bearing assembly 34 in the center of the outer end of the crank casing head 35 which projects forwardly or outwardly from the crank casing proper 36.

Each pump chamber 23 is provided with an intake port 37 and a discharge port 38 which are controlled by valves 39 and 40, respectively. These valves are cylindrical and are slidable in bores that extend inwardly, parallel to the shafts and intersect the median plane of the gears, through the outer closure plate 15; bores 41 for the intake valves 39 terminating within the inner closure plate 13; whereas bores 42, for the discharge valves 40, extend through the entire pump housing and through flange 12 on the crank shaft 10. Multiple passages are needed for each pump intake port, those to supply oil and another to supply air, for circulation. The bores 41 in which the intake valves 39 are mounted are made to serve as passages through which the necessary air is supplied to the pump gear chambers, but special intercommunicating passages must be provided for delivering oil to the pump gear chambers.

In the arrangement shown in the drawings, each oil intake passage is made up of several communicating sections. The first axially disposed section 44 of each such intake passage opens into one of the axial bores 41, so as to be under the control of the corresponding intake valve 39 slidably mounted therein, and extends inwardly or rearwardly into flange 12 on the crank shaft 10. From that point a second transversely disposed section 45 communicates with section 44 and extends radially to the axis of the crank shaft.

An axially disposed passage 46 extends centrally and axially of the shaft 10 and functions as a common oil supply passage for all three sets of passages 44 and 45 and is therefore larger in diameter than the other passage sections 44 and 45. Any desired number of oil intake passage sections 47 radiate from the common passage section 46 and open out through the periphery of the crank shaft 10 a short distance from the flange 12; there being preferably three of the passage sections 47.

Surrounding the crank shaft 10, and covering the peripheral inlet openings of passage sections 47, is a stationary collar 48, grooved on its inner side to create an annular port 49 that communicates with all of the radial passage sections 47. A vertical oil supply conduit 50, disposed below and fixed to the collar 48 opens at its upper end into port 49 and extends down into the vicinity of the bottom of the crank casing 36. This conduit 50 is provided at its lower end with a strainer 51 and, at an intermediate point, with a suitable check valve 52 to prevent down flow through the conduit 50.

The strainer is submerged in the oil, being positioned well below the normal oil level 53.

A small conduit 54 is connected to the upper side of the collar 48 and communicates with the annular port 49 therein through a preferably restricted orifice 55. By connecting this conduit 54 to any suitable lubricating pump with which the engine is provided, the oil passages 44, 45, 46 and 47 may at all times be kept filled, so that no priming of the hydraulic coupling is necessary when starting to transmit power to the output shaft 11.

The intake and discharge control valves 39 and 40 are tubular and are substantially longer than the bores 41 that contain the intake valves 39. The inner ends of the intake valves 39 are closed and each valve contains a transverse partition 39ª spaced a short distance from the inner end thereof. There are two circumferentially spaced relatively angularly offset oil inlet openings 39ᵇ and 39ᶜ in the cylindrical wall of each of these intake valves 39 located axially between the partition 39ª and the inner closed end, and also a third air inlet opening 39ᵈ on the opposite side of and near the partition 39ª.

The oil inlet openings 39ᵇ and 39ᶜ are so spaced, axially of each tubular intake control valve, relatively to the air inlet opening 39ᵈ that when these valves are positioned at the inner limits of their movements, as in Fig. 1, the corresponding oil passages 44 and 45 are shut off and only air is admitted into the pump intake ports 37; the air passing freely through constantly open outer inlet ends of the intake valves 39 and through their open air inlet wall openings 39ᵈ into their corresponding intake ports 37.

Figure 5:
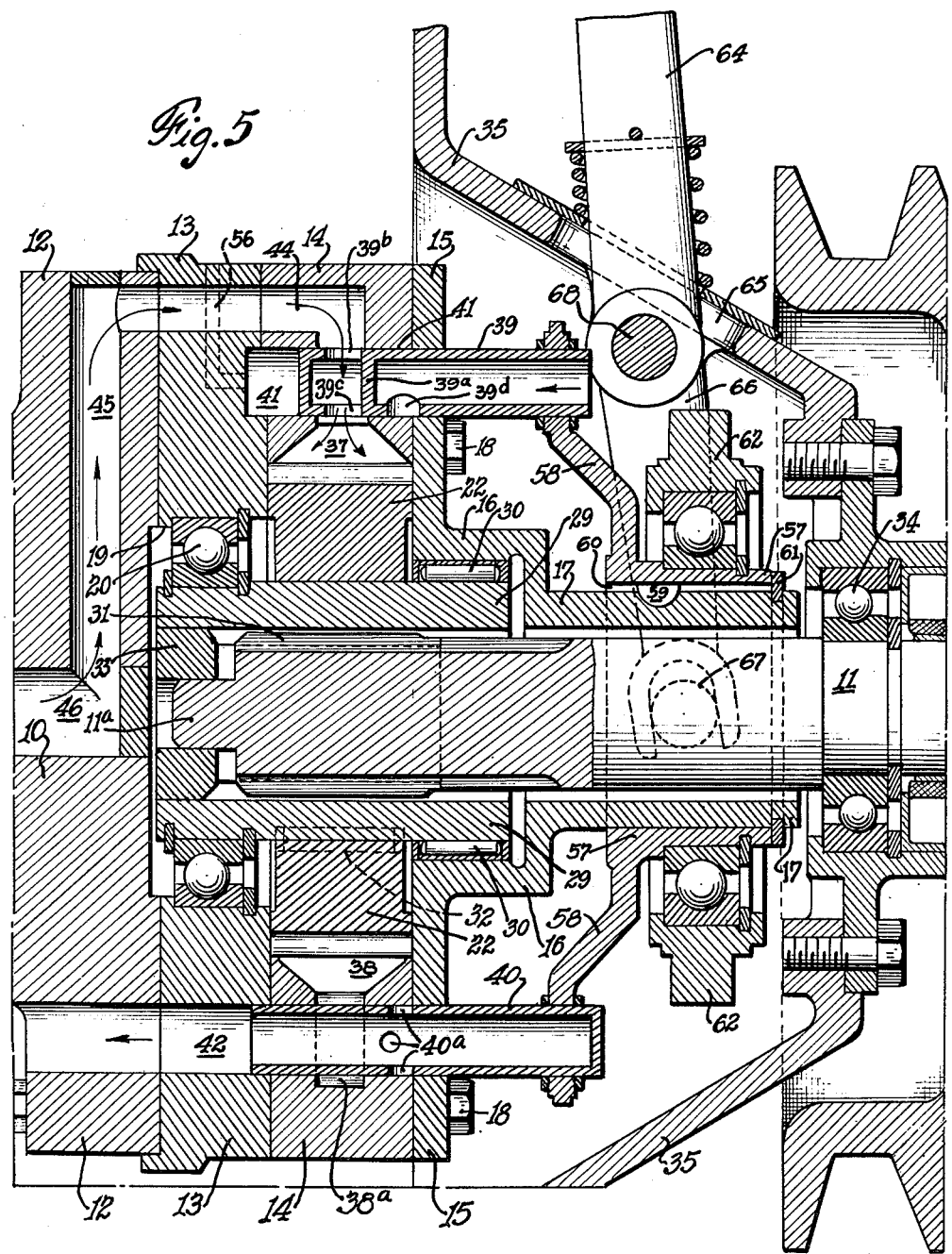
Fig. 5 is an enlarged longitudinal section taken on an irregular line C—D of Fig. 3, being a longitudinal section taken at a slightly different plane than Fig. 1, and showing the intake and discharge valves shifted into positions for transmitting maximum speed and torque.

When the intake valves 39 are moved to their outermost positions, as in Fig. 5, only oil can enter the intake ports 37. The distance between the air inlet opening 39ᵈ and the oil inlet openings 39ᵇ and 39ᶜ is less than the width of the inlet opening of the intake port 37, so that, in changing from a condition under which only one of the two fluids is circulated to a condition which permits circulation of only the other fluid, both fluids are circulated through the pumping means in relatively varied proportionate mixtures.

In order to avoid a dashpot effect upon shifting the intake valves 39, the closed ends of bores 41 are each vented to the atmosphere through a restricted passage 56 that leads to the periphery of the pump housing.

The discharge valves 40 may be simple sleeves, but are shown as having their outer ends closed, thereby causing the discharge of the fluids to be away from, instead of toward, the crank casing head 35. The discharge control valves 40 each extend through a diametrically enlarged portion of a passage 38a in the pump body 14 which communicates with a corresponding discharge port 38. Through the wall of each discharge valve 40, intermediate its ends, extend four circumferentially equally spaced discharge openings 40ª through which the fluids discharge into the discharge valve 40 and therefrom through the discharge passage 42 into the crank casing. While the size and relative arrangement of the discharge openings 40ª in the discharge valves 40 may be varied, I prefer to arrange such openings 40a so that they will prevent abrupt closing of the pump discharge ports 38. In the arrangement shown, there are four like openings 40ª arranged in each discharge valve 40 in pairs, the openings 40ª in each pair being diametrically opposite each other, with the two pairs partially displaced relatively to each other, lengthwise of the valve, a distance about equal to the radius of one of the openings 40ª.

The protruding outer ends of the valves 39 and 40 extend through and are fixed to the arms of a spider, comprising a sleeve 57 slidably mounted on the sleeve portion 17 of the outer pump housing closure, and having six arms 58 integral therewith and radiating therefrom. Sleeve 57 is shorter than the sleeve portion 17 on the hub of the outer closure member, so that it may slide lengthwise along the latter. A key 59, projecting from the periphery of sleeve 17 into a longitudinal keyway 60 in sleeve 57, permits such sliding movements while compelling the spider to revolve with the pump housing.

An annular snap ring stop 61, on sleeve 17, near the outer end of the latter, limits outward movement of the spider and, therefore, of the valves. The closed end of hub 16 serves as a stop to limit the inward movements of the spider and valves 39 and 40.

Surrounding sleeve 57 and rotatable relatively thereto, while held against relative axial movements, is a shift collar 62. A shifting lever 64 extends into the crank casing head 35 through an opening 65 therein above the shift collar 62, and is provided at its lower end with a fork 66 that embraces the shift collar 62 and is operatively interengaged with trunnions 67 on the latter. The operating lever 64 is mounted on a pivot pin 68, just inside the crank casing head 35, for swinging movements in the direction to move the valves from one extreme position to the other.

Referring to Figs. 3, 7, 8 and 9:

In addition to the intake and discharge valves, I prefer to employ relief valves 69 to protect the mechanism in case of unexpected heavy overloads; these valves 69 extend through substantially extended portions of the passages 38ª that constitute extensions, within the pump body 14, of the discharge ports 38 in the circumferential direction. Valves 69 are contained in cylindrical bores 70, that extend axially part way through body 14, from the rear or inner side thereof, and axially intersect the extensions of passages 38ᵃ. An exhaust passage 71 extends from each of these bores 70 through closure plate 13 and flange 12 on the crank shaft, for fluid discharge therethrough into the atmosphere. A small bore 72 extends from the outer end of each bore 70 partially into the closure plate 15 and there communicates with a recess 74 of somewhat larger diameter. A small axially disposed discharge passage 75 extends from each passage 38ᵃ and through a small connecting passage 75ᵃ, within the inner face of closure plate 15, communicates with the recess 74.

Each relief valve 69 is a cylindrical cup having a depth less than the length of one of the bores 70, with an axial plunger or cylindrical projection 69ᵃ extending from end wall 69ᵇ of the valve through bore 72, which it fits, into recess 74. In the cylindrical wall of each relief valve 69 are a plurality of outlet openings 77 in a circumferential row near the closed end of the valve. Disposed within each valve 69 is a compression spring 78, under initial compression, that bears at one end against plate 13 and at its other end against the inner side of the end wall 69ᵇ of the valve. This spring 78 normally holds the relief valve 69 in its closed position, the outlet openings 77 positioned beyond one side of passage 38ᵃ; this being the normal position. Should the pressure in the pump become excessive, however, the fluid pressure extending through port 38 and through passages 38ᵃ, 75 and 75ᵃ into recess 74 against the outer end of plunger 69ᵇ overcomes the resistance of the spring 78 and forces the valve 69 toward the left as viewed in Figs. 8 and 9, until ports 77 open directly into passage 38ᵃ and when this happens, the oil under pressure may escape through the valve and out through the exhaust passage 71, thus relieving the pressure. When the pressure is reduced to normal, the springs 78 automatically close the relief valves 69.

The operation of the transmission will now be described briefly.

Assuming that the intake valves 39 and discharge valves 40 are at the inner limits of their movements, as in Fig. 1, communication between the pump intake ports 37 and the oil intake passages is interrupted; whereas, air inlet openings 39ᵈ in the intake valves 39 are registering with the pump intake ports 37.

Therefore, only air can be drawn into the pump chambers at this time. The discharge openings 40ᵃ in the discharge valves 40 now register with the outlet ends of the pump discharge ports 38. When the engine is started, the crank shaft 10 rotates and revolves the pump housing and the planet gears with it. As the planet gears 24 begin to roll along the periphery of the sun gear 22, the resistance offered by the air which circulates through the pump is so small that no substantial power is transmitted to the sun gear 22 or, through the same, to the driven shaft 11, and that shaft remains stationary if operatively connected to an instrumentality to be driven thereby.

When it is desired to apply power to the driven shaft 11, the control lever 64 is progressively swung to the left, as viewed in Fig. 1. This results in progressively shifting the valves 39 and 40 toward the right. During such progressive movement of the valves, the air inlet openings 39ᵈ in the valves 39 start to progressively close and simultaneously the oil inlet openings 39ᵇ and 39ᶜ start to progressively open.

During such progressive outward movement of the intake and discharge control valves the flow of air into the pump is being progressively decreased while simultaneously the flow of oil for admixture with air is being progressively increased while simultaneously the discharge of fluid from the pump is being progressively restricted; the inlet and outlet openings of the intake and discharge valves being so relatively spaced that in one position of the lever 64 the oil inlet openings are partially open, the air inlet openings are closed while the fluid discharge openings in the discharge valves are still partially open. Upon further outward movement of the valves to their outermost positions the oil inlet openings will be fully open, the air inlet openings will be closed and the fluid discharge openings of the discharge valves will be fully closed.

The progressively increased admixture of oil to the progressively decreased flow of air into the pump imparts a progressively increased speed and torque to the driven shaft 11; the maximum speed and torque being imparted to the driven shaft when the oil intake ports are fully open while the air intake and fluid discharge ports are fully closed.

The driven shaft 11 may be allowed to run at any desired speed less than that of the crank shaft by arresting the movement of the lever 64 when that desired speed is reached. To attain maximum speed and power for the driven shaft, the lever 64 is moved to the left to the position as shown in Fig. 5, at which time the discharge valves 40 are fully closed and the oil is trapped in the pump body plate 14; the air inlet openings 39ᵈ in the intake valves 39 being fully closed prior to the final closed position of the discharge valves 40, thus insuring that all air shall have been excluded from the circulating oil by the time the lever 64 reaches its high speed position.

During the operation of the clutch, oil drawn into the pump chambers by suction through intake valves 39 is supplied through the main supply conduit 50.

With the engine running, oil is automatically forced from a forced feed lubricating system through conduit 54 into the annular port 49 and from there into the oil passages in the crank shaft and pump body, so that oil may be drawn into the pump chambers instantly upon even a very slight uncovering of the oil inlet openings 39ᵇ and 39ᶜ in the intake valves 39.

It is evident that the annular port 49 surrounding the drive shaft 10 may be supplied with oil entirely through the upper conduit 54 so that, unless there be a local reservoir available, the transmission can operate with oil delivered from a remote reservoir.

It is understood that suitable modification may be made in the structure and arrangement disclosed in the appended drawings provided such modifications come within the spirit and scope of the appended claims.

I claim:

1. In combination, a power-driven rotatable driving shaft, a pump housing fixed to said driving shaft, a driven shaft, a rotary gear pump in said housing operatively connected to the housing and to the driven shaft including a plurality of fluid intake ports and a plurality of fluid discharge ports, an oil passage extending within said driving shaft and pump communicating with the intake ports, a stationary oil-supplying conduit, a device attached to the conduit and slidably engaged with said driving shaft and containing an oil channel in registration with an inlet end of said oil passage to deliver oil to the latter, combined air and oil intake control valves interposed between the outlet ends of the oil passage and the inlets of the intake ports progressively movable to successive positions wherein only air, or a relatively variable proportionate mixture of air and oil, or only oil, is admitted into said intake ports for circulation through the pump, and a plurality of fluid discharge control valves in said pump progressively movable simultaneously with said intake control valves to progressively restrict fluid discharge from said discharge ports during circulation through said pump of the mixture of progressively increased flow of oil with a progressively decreased flow of air, said discharge control valves completely arresting fluid discharge when said combined air and oil control valves are fully open to the inflow of only oil into said intake ports to thereby control the stationary position or relatively variable rotations and torque of said driven shaft during the rotation of said driving shaft.

2. In a variable speed transmission including a rotary driving shaft, a driven shaft, and a hydraulic variable speed mechanism operatively connecting said shafts: the improvement which consists in a pump fixed to the driving shaft, said pump having an intake port inlet, and an air passage open to the atmosphere and leading to said intake port inlet, and an oil passage within the driving shaft and extending from said intake port inlet and terminating in an inlet open to the exterior of the driving shaft beyond the pump, means to deliver oil from a remote source into said open inlet end of the oil passage in the driving shaft during its rotation, a tubular valve shiftable in said air passage at said intake port inlet to close it against either the air or oil passage or open it gradually to either passage while gradually closing it against the other passage, a fluid discharge port in said pump, a fluid discharge control valve movably mounted on said pump for progressively restricting and arresting fluid flow through said discharge port, and means operatively connected with said intake and discharge control valves for actuating said valves during the rotation of said pump by said driving shaft.

3. In a hydraulic speed transmission including a rotary driving shaft, a driven shaft, and a hydraulic power-transmission mechanism operatively connecting said shafts, said mechanism including fluid pumping means having a housing therefor fixed to the driving shaft and elements rotatable relatively to the housing, one of which elements is fixed to the driven shaft; the improvement which consists in said housing having a plurality of pump chambers each provided with an intake port and a discharge port and a valve passage communicating with each port and leading to the atmosphere, a separate oil intake passage communicating at its outlet end with the inlet of each intake port and all of said oil intake port passages communicating with a common oil intake passage extending within said driving shaft which common intake passage has at least one inlet opening at the exterior of said driving shaft, stationary means encompassing said driving shaft and containing in the shaft-engaging face thereof an annular channel in registration with said common intake passage inlet opening, conduit means for supplying oil to said channel from a remote source of oil supply, an individual valve for each intake and discharge port valve passage arranged parallel to the axis of the shafts and fitting slidably in and protruding from said valve passages, each intake port control valve being provided with a pair of longitudinally spaced separate oil and air passages that allow fluid from only one passage to enter the intake port when the intake port control valve is in either of two extreme positions whereas in intermediate positions of the intake port control valve both oil and air may enter the intake port in relatively variable proportionate mixtures depending on the position of the intake port control valve at any given time, the discharge port control valves being movable in unison with said intake port control valves to progressively restrict fluid discharge from the discharge ports while said intake port control valves are progressively moved to admit a progressively increased flow of oil into the intake ports, and a common actuator for all of said intake and discharge control valves secured to the protruding ends of the valves.

4. In a variable speed hydraulic transmission including a driving shaft, a driven shaft, a hydraulic coupling between said shafts comprising a gear-type pump having a housing fixed to the driving shaft and intermeshing gears including a sun gear that is fixed to the driven shaft and a plurality of planet gears carried in said housing in mesh with the sun gear each rotatively mounted in a separate pump chamber the improvement which consists in the driving shaft having at least one oil inlet opening within the periphery, an oil passage extending from said driving shaft inlet opening through portions of the driving shaft and into said housing to the intake side of each pump chamber, stationary means for continuously supplying oil into said oil inlet opening from a source of supply disposed remotely of said housing, and during the rotation of the driving shaft, said housing having therein an air intake port open at one end to the atmosphere and leading to the intake side of each pump chamber and said housing also containing a fluid discharge port leading from each pump chamber to the atmosphere, a tubular intake control valve at the intake side of each pump chamber actuable to admit only oil or air or relatively varied proportionate mixtures of oil and air to enter the intake ports and pump chambers, individual valves controlling fluid discharge from said discharge ports, and means to operate all of the valves in unison.

5. In a variable speed hydraulic transmission improvement as set forth in claim 4 wherein said stationary oil supply means consists of a stationary member embracing said driving shaft and containing in the shaft-engaging face thereof an annular channel, a conduit communicating at one end thereof with said source of oil supply and at its opposite end with said channel, and said driving shaft oil inlet opening or openings being in constant registration with said channel for reception of flow of oil therefrom into said oil passage.

6. In a variable speed hydraulic transmission improvement as set forth in claim 4, wherein each tubular intake control valve has longitudinally spaced separate oil and air inlet openings, and wherein said oil and air inlet openings are so spaced longitudinally that in the extreme positions of the intake valve only one of the fluids may enter the corresponding intake port and pump chamber, whereas both fluids enter said intake port and chamber in relatively varied proportionate mixtures as the intake valve is moved from one extreme position to the other.

References Cited in the file of this patent

UNITED STATES PATENTS

| | | |
|---|---|---|
| Re. 22,577 | Thomas | Dec. 12, 1944 |
| 1,136,168 | Rich | Apr. 20, 1915 |
| 1,458,565 | Weston | June 12, 1923 |
| 1,748,436 | Arkin | Feb. 25, 1930 |
| 1,883,685 | Gasterstadt | Oct. 18, 1932 |
| 1,935,400 | Junkers | Nov. 14, 1933 |
| 2,420,305 | Donahew | May 13, 1947 |
| 2,548,920 | Thomas | Apr. 17, 1951 |

FOREIGN PATENTS

| | | |
|---|---|---|
| 407,939 | Great Britain | Mar. 26, 1934 |